3,480,443
MANUFACTURE OF FERMENTED
MILK PRODUCTS
Rolf Schuler, Berg, Starnberger See, Germany, assignor to EVOG, Etablissement fur Verwaltung and Organisation, Vaduz, Liechtenstein
No Drawing. Filed Mar. 30, 1966, Ser. No. 538,543
Claims priority, application Austria, Apr. 2, 1965, A 3,039/65
The portion of the term of the patent subsequent to June 20, 1984, has been disclaimed
Int. Cl. A23c 9/12, 19/02
U.S. Cl. 99—59       3 Claims

ABSTRACT OF THE DISCLOSURE

A method of manufacturing a fermented milk product in which a bacteria selected from the group consisting of *Lactobacillus acidophilus, Lactobacillus bifudus,* intestinal streptococci and mixtures thereof is inoculated in a preliminary culture medium consisting essentially of (a) sterile milk, (b) between about 0.0005–0.09 percent by weight of growth medium and (c) about 1–6 percent by weight of nutrient medium in order to form a preliminary culture and the preliminary culture including the culture medium is then inoculated into a further quantity of sterile milk in order to produce a cultured milk product which contains the bacteria in a viable and propagable condition.

---

This invention relates to a method for manufacturing milk products, specifically sour milk and similar types of milk in which a parent culture of intestinal symbionts of the human body is preliminarily propagated in milk and the preliminary culture is subsequently added to the milk to be used for making the final cultured milk product.

In all known methods for manufacturing cultured milk products which are based on the concept of introducing to the human body intestinal symbionts by means of milk products, it is very difficult to retain in the finished milk product a large quantity of bacteria of the intestinal flora which bacteria are living or even able to propagate.

In order to avoid this disadvantage when *Lactobacillus acidophilus* is used as the parent culture, it has already been suggested to add casein peptone in small quantities to the milk in which the parent culture is preliminarily propagated in order thereby to propagate especially vigorous *acidophilus* bacteria which remain viable also in the final milk product. This method sometimes leads to good results, but the amount of casein peptone added cannot be as large as it would frequently be desirable to make it because the casein peptone which is introduced into the final milk product together with the preliminary culture will impair the taste of the milk product. From this it is evident that it is not possible in this manner to manufacture, for instance, a sour milk using human intestinal symbionts exclusively.

The purpose of the invention is to provide a procedure of the type described above which leads to the presence of a sufficient amount of living and propagable bacteria of the human intestinal flora in milk products. According to the invention this is achieved by adding to the milk that is used for propagating the preliminary culture, growth and nutrient media for the intestinal symbionts or a mixture of such substances. The growth and nutrient media, however, do not cause an undesirable effect on the taste or color of the milk product. The growth and nutrient media are added, depending on the particular media used, in amounts of (a) from 0.0005–0.09 percent by weight of one or a mixture of several growth media and (b) from 1–6 percent by weight of one or a mixture of several nutrient media the percentages being based on the amount of milk used in the preliminary culture. The invention is based on the concept that it is not enough for assured preservation of living and propagable bacteria of the intestinal flora in the finished milk product to affect the intestinal symbiont culture merely during the phase of preliminary propagation. Therefore, growth and nutrient media promoting the growth of the microorganisms are, according to the method of the invention, added to the preliminary culture in such a large amount that, even after the resulting dilution caused when the preliminary culture is introduced into the milk to be used for manufacturing the end milk product, there is still a sufficient amount of growth and nutrient media in the product available for the intestinal symbionts, that said symbionts are preserved in a condition in which they are not only viable but also propagable to a high degree. Since in this manner a considerable amount of growth and nutrient media become present in the final milk product, it is a basic requirement for the practicability of the method according to the invention that media are selected which do not unfavorably affect the taste and the color of the final milk product. This condition is achieved by using the previously indicated amounts of the respective media. Naturally, the growth and nutrient media which are more noticeable in taste or color are added in quantities near the lower limits of the indicated ranges of quantities, while the nutrient and growth media which are less noticeable in color or taste can be used in quantities near the upper limits.

The addition to the preliminary culture of the media which promote the intestinal symbionts in the amounts as indicated above results in the following advantages:

(A) By the rapid growth of the intestinal symbionts and the rapid formation of the preliminary culture and of the end product obtained using the preliminary culture, the growth of accompanying bacteria, possibly existing as impurities (for instance from not completely sterile milk), is appreciably hindered. The danger of the preliminary culture or the end product containing excessive amounts of such accompanying bacteria is for this reason so minor that the addition of preservatives becomes unnecessary.

(B) The rapid growth of the intestinal symbionts and the rapid fermentation of the preliminary culture and of the end product obtained using the preliminary culture make it possible to produce, respectively, sour milk products and food made from types of sour milk with the use of intestinal symbionts exclusively.

For the method according to the invention, there are to be used as parent cultures mainly *Lactobacillus acidophilus, Lactobacillus bifidus* and intestinal streptococci. The suitable nutrient and growth media for these parent cultures are indicated below together with the quantitative limits which are to be maintained if the respective media are used alone. If a mixture of several such media is used, then the sum of the quantities must be kept within the limits indicated above for the method according to the invention, i.e., 0.0005–0.09 percent for the total amount of the growth media used and 1–6 percent for the total amount of the nutrient media used, the percentages being based on the amount of milk used in the preliminary culture.

*Lactobacillus acidophilus*

|  | Percent |
|---|---|
| Barm or commercial yeast extract [1] | 1–6 |
| Sodium acetate [2] | 1–6 |
| Barm [1] | 1–6 |
| Beer wort [1] | 1–6 |
| Alete sugar® (dextrinmaltose) [2] | 0.2–2 |
| Manganese salts [2] | 0.2–2 |
| Malt extract [2] | 1–6 |

Lactobacillus bifidus

| | Percent |
|---|---|
| Sodium acetate [2] | 1–6 |
| Cystine [1] | 0.2–0.6 |
| Ascorbic acid [3] | 0.03–0.08 |
| p-Aminobenzoic acid [3] | 0.0005–0.01 |
| Liver broth [2] | 1–6 |
| Liver extract or concentrate [2] | 1–4 |
| Unsaturated sebacic acids (arachidonic acid) [2] | 1–6 |

Intestinal streptococci

| | Percent |
|---|---|
| Extract from from meat [1] | 1–5 |
| Extract made from heart [1] | 1–5 |
| Extract made from pancreas [1] | 1–5 |

[1] Nutrient and growth medium.
[2] Nutrient.
[3] Growth medium.

If a sour milk product is to be manufactured using *Lactobacillus acidophilus* as a parent culture, it is necessary for achieving an economically justifiable short fermentation period to add to the milk product, in addition to the *Lactobacillus acidophilus* culture, common lactic acid forming bacteria. Such a second preliminary culture, which may contain *Streptococcus lactis* or *S. thermophilus* or *S. faecalis* or *S. cremoris*, is usually also preliminarily propagated in milk. It has been shown that by means of the method according to the invention, especially good results are achieved if, to the milk used for propagating the second preliminary culture, a medium is likewise added which promotes the growth of the intestinal symbionts forming the first preliminary culture but does not cause a significant impairment of the taste or color of the milk product, again in amounts of 0.0005–0.09 percent for growth medium and 1–6 percent, based on the amount of milk of the preliminary culture for nutrient medium.

The method is explained in the following with the aid of examples.

EXAMPLE 1

Manufacture of *acidophilus* sour milk

First there is manufactured a first parent culture of *Lactobacillus acidophilus* on a culture medium comprised of the following:

| | |
|---|---|
| Peptone made of meat | g__ 15 |
| Commercial yeast extract | g__ 6 |
| Dextrose | g__ 10 |
| Tween 80 | ml__ 1 |

The ingredients are dissolved in a small amount of water, the solution is diluted to 1000 ml. with sterilized milk and the pH is adjusted to 6.5–6.8. This medium is inoculated with 5 percent of a 48 hour *Lactobacillus acidophilus* culture. The medium is incubated for 48 hours at 37° C. Out of this parent culture a preliminary culture is propagated in a medium comprised of the following:

Commercial yeast extract 60 g. are diluted with water to make 100 ml. and sterilized. This solution is then mixed with 900 ml. sterilized milk to which 10 g. dextrose have been added before sterilization. This preliminary culture medium is preheated to about 40° C. and then is inoculated with 5 percent of the parent culture. Incubation is carried out for 24 hours at 37° C. For making the *acidophilus* sour milk, pasteurized milk having been cooled to about 40° C. is inoculated with 4 percent of the preliminary culture. Incubation is carried out at 37°–38° C. milk temperature. Thickening occurs after about three hours. The product then has about 30 SH°. After thickening has occurred, the product should be cooled in order to avoid separation of the whey.

EXAMPLE 2

Manufacture of *acidophilus*-streptococcus sour milk

Preparation of the parent culture is carried out as described in Example 1. In preparing the preliminary culture also 5% of a 24 hour streptococcus culture in regular milk are added to the preliminary culture medium as described above in addition to the *acidophilus* parent culture. The further manufacturing process proceeds as described above in Example 1. Thickening occurs then after about two and one-half hours.

EXAMPLE 3

Manufacture of a sour milk using *Lactobacillus bifidus* and *Lactobacillus acidophilus*

Preparation of the parent culture of *Lactobacillus acidophilus* is carried out as described in Example 1. The parent culture of *Lactobacillus bifidus* is prepared on a liquid nutrient medium comprised of the following, for example:

| | | |
|---|---|---|
| Sodium sulfate | g__ | 5 |
| Sodium acetate | g__ | 5 |
| Magnesium sulfate | g__ | 0.5 |
| Sodium phosphate | g__ | 1.1 |
| Potassium phosphate | g__ | 0.9 |
| Asparagin or peptone | g__ | 5 |
| Milk sugar | g__ | 10 |
| Cystine | g__ | 0.2 |
| Ascorbic acid | g__ | 0.05 |
| p-Aminobenzoic acid | g__ | 0.0001 |
| Liver broth | ml__ | 40 |

Dilute with water to make 1000 ml.

The medium is inoculated with 5 percent of a *Lactobacillus bifidus* culture whose fermentation must have reached a pH value of 4.4–4.6. Incubation of the parent culture is carried out at 37° C. until a pH value of 4.4 again is reached. A preliminary culture medium is inoculated with 5 percent of this parent culture. The preliminary culture medium is comprised of the following:

| | | |
|---|---|---|
| Sodium acetate | g__ | 5.0 |
| Magnesium sulfate | g__ | 0.5 |
| Asparagine or peptone | g__ | 10.0 |
| Cystine | g__ | 0.2 |
| Ascorbic acid | g__ | 0.3 |
| Liver broth | ml__ | 40 |

The ingredients are dissolved in a small amount of water, sterilized, and the solution is then increased to 1000 ml. with sterile milk.

Preparation of the preliminary culture of *Lactobacillus acidophilus* is carried out as described above. Both of said preliminary cultures are introduced into the milk to be used for production with an amount of inoculation of about 5 percent and the milk is incubated at about 38° C. Thickening occurs after about three hours.

EXAMPLE 4

Manufacture of a buttermilk-like beverage by means of *Lactobacillus acidophilus* and *Lactobacillus bifidus*

Preparation of the parent cultures and the preliminary cultures is carried out as described in Example 3. Incubation of the preliminary cultures is carried out at 38° C. for five hours. Both preliminary cultures are then, at a concentration of 2–4 percent, each mixed with skimmed milk, 2 percent of a strong butter-making acid generator are added and incubated at 20° C. The duration of the incubation period depends on how strong the development of aroma of the butter-making acid generator is to be, usually it takes about six hours.

As the above examples show, mixed cultures of intestinal symbionts may also be used, to which then suitable mixtures of the growth and nutrient media are added. Further additional aroma-forming substances may be added to the milk which is to be used for manufacturing the finished milk product. Also a rennet curdling of the milk protein can be carried out. Finally, it may be practical to add cold stabilizers.

All of the procedures of the method as evident from the description can also in any one combination be basically part of the invention.

Although particular preferred embodiments of the invention have been disclosed above in detail for illustrative purposes, it will be recognized that variations or modifications of such disclosure, which come within the scope of the appended claims, are fully contemplated.

The embodiments of the invention in which an exclusive property or privilege is claimed are defined as follows:

1. A method of manufacturing a fermented milk product, which comprises the steps of:
   (1) preparing a preliminary culture medium by mixing sterile milk, and nutrient and growth media, as defined hereinbelow
   (2) inoculating the preliminary culture medium with bacteria and then incubating the preliminary culture medium to form a preliminary culture of the bacteria, the bacteria and the nutrient and growth media being selected from one of the three following-named combinations, with the nutrient and growth media for each combination being selected from the group consisting of the named media used in the listed percentages by weight, based on the weight of the sterile milk used in the preliminary culture medium, (a) Bacteria—*Lactobacillus acidophilus*

Nutrient and growth media

| | Percent |
   |---|---|
   | Yeast extract | 1–6 |
   | Sodium acetate | 1–6 |
   | Barm | 1–6 |
   | Beer Wort | 1–6 |
   | Dextrin-maltose | 0.2–2 |
   | Manganese salts | 0.2–2 |
   | Malt extract | 1–6 |

(b) Bacteria—*Lactobacillus bifudus*

Nutrient and growth media

| | Percent |
   |---|---|
   | Sodium acetate | 1–6 |
   | Cystine | 0.2–0.6 |
   | Ascorbic acid | 0.03–0.08 |
   | p-Aminobenzoic acid | 0.0005–0.01 |
   | Liver broth | 1–6 |
   | Liver extract or concentrate | 1–4 |
   | Unsaturated sebacic acids | 1–6 |

(c) Bacteria.—intestinal streptococci

Nutrient and growth media

| | Percent |
   |---|---|
   | Extract made from meat | 1–5 |
   | Extract made from heart | 1–5 |
   | Extract made from pancreas | 1–5 | the total amount of the nutrient and growth media in the preliminary culture medium being between 1.0005 and 6.09 percent, based on the weight of the milk used in the preliminary culture medium so that a considerable amount of the nutrient and growth media are still present in the preliminary culture medium at the end of the incubation step, said media having the characteristic that it does not affect the color and taste of the final cultured milk product,
   (3) then inoculating a further quantity of sterile milk with said preliminary culture including said preliminary culture medium containing the excess nutrient and growth media in order to produce the final cultured milk product which contains said bacteria in a viable and propagable condition.

2. A method as claimed in claim 1, which includes the further steps of preparing a second preliminary culture medium consisting essentially of (a) sterile milk, (b) between about 0.0005–0.09 percent by weight, based on the weight of the sterile milk, of a growth medium or a mixture of growth media, and (c) between about 1–6 percent by weight, based on the weight of the sterile milk, of a nutrient medium or a mixture of nutrient media, said media having the characteristic that they do not unfavorably affect the color and taste of the final cultured milk product;

inoculating said second preliminary culture medium with a second bacteria selected from the group consisting of *Streptococcus lactis*, *Streptococcus thermophilus*, *Streptococcus faecalis* and *Streptococcus cremoris*, and incubating said second preliminary culture medium to form a preliminary culture of said second bacteria;

said further quantity of sterile milk also being inoculated with said preliminary culture of said second bacteria including said second preliminary culture medium to produce the final cultured milk product which contains members of both groups of bacteria.

3. A method as claimed in claim 1, in which a second preliminary culture of another member of said group of bacteria is prepared in the same way as the first-named preliminary culture and said further quantity of sterile milk is inoculated with both preliminary cultures so that the final cultured milk product contains both bacteria is a viable and propagable condition.

References Cited

UNITED STATES PATENTS

| | | | |
|---|---|---|---|
| 2,936,237 | 5/1960 | Burbach et al. | 99—59 |
| 3,142,575 | 7/1964 | Tynan et al. | 99—116 |
| 3,326,693 | 6/1967 | Reuter | 99—59 |

OTHER REFERENCES

Hassinen et al., J. Bacteriology, vol. 62, 1951 (pp. 771–777).

György et al., J. Bacteriology, vol. 69, 1955 (pp. 483–490).

LIONEL M. SHAPIRO, Primary Examiner

D. M. NAFF, Assistant Examiner

U.S. Cl. X.R.

99—116